United States Patent [19]

DeNardo

[11] 4,273,313

[45] Jun. 16, 1981

[54] GUIDE FOR A CUTTING TORCH

[76] Inventor: John M. DeNardo, 1044 Amherst St., Buffalo, N.Y. 14216

[21] Appl. No.: 135,294

[22] Filed: Mar. 31, 1980

[51] Int. Cl.$^3$ .............................................. B23K 7/10
[52] U.S. Cl. ...................................... 266/66; 266/58; 266/76
[58] Field of Search ....................... 266/48, 58, 64, 66, 266/71, 76

[56] References Cited

U.S. PATENT DOCUMENTS

| | | | |
|---|---|---|---|
| 1,668,085 | 5/1928 | Orzel | 266/71 |
| 1,704,473 | 3/1929 | Green | 266/66 |
| 2,464,351 | 3/1949 | Shorter | 266/64 |
| 2,525,241 | 10/1950 | Rentsch | 266/66 |
| 2,603,475 | 7/1952 | Rotsch | 266/66 |
| 2,747,856 | 5/1956 | Burdwood | 266/66 |
| 3,139,471 | 6/1964 | Root | 266/66 |
| 3,514,087 | 5/1970 | Richards | 266/66 |
| 3,698,701 | 10/1972 | Straub | 266/66 |
| 3,734,477 | 5/1973 | Enfantino | 266/58 |

Primary Examiner—Aaron Weisstuch
Assistant Examiner—John P. Sheehan
Attorney, Agent, or Firm—Sommer & Sommer

[57] ABSTRACT

A guide is adapted to be adjustably mounted on the nozzle marginal end portion of a cutting torch. The guide has a convex lower cam surface adapted to slidably engage a straight-edge. The cutting torch may be tilted to a position determined by the operator, and slidably moved along the straight-edge to afford an improved "cut" in the workpiece.

5 Claims, 3 Drawing Figures

GUIDE FOR A CUTTING TORCH

BACKGROUND OF THE INVENTION

1. Field of the Invention

The present invention relates generally to a field of cutting torches, and more particularly to an improved guide for maintaining the desired spacing of the torch discharge face from a workpiece.

2. Background of the Invention

The use of cutting torches to "cut" a workpiece, is well known. Normally, the torch is hand-held, and may wobble or vary in spacing from the workpiece, depending largely upon the expertise of the operator.

It has also been known that the flame discharged by the torch should be inclined slightly forwardly in the direction of travel so as to preheat proximate material in advance of the porpogating "cut".

Details of apparatus for use with such cutting torches may be shown in one or more of the following U.S. Pat. Nos.: 2,525,241; 2,603,475; 2,747,856; 3,139,471; 3,514,087; and 3,698,701.

SUMMARY OF THE INVENTION

The present invention provides an improved guide which is adapted to be mounted on the nozzle marginal end portion of a cutting torch, and used in connection with a straight-edge for guiding the movement of such cutting torch along a workpiece.

The improved guide includes a member, and means, such as a set screw, for selectively holding the member on the nozzle end portion. The member has an upper surface, a side surface, and a convex lower surface configured as a cam and adapted to slidably engage the straight-edge. The member also has a vertical through passage to accommodate the nozzle marginal end portion.

Accordingly, the general object of the present invention is to provide an improved guide for use with a cutting torch.

Another object is to provide such an improved guide that may be adjustably mounted on the nozzle marginal end portion of a cutting torch.

Another object is to provide such an improved guide so that the operator may more easily control the spacing of the nozzle from the workpiece.

Still another object is to provide such an improved guide which may enable the operator to make a more efficient "cut" in a workpiece.

These and other objects and advantages will become apparent from the foregoing and ongoing written specification, the drawings, and the appended claims.

DESCRIPTION OF THE PREFERRED EMBODIMENTS

Figure 1:
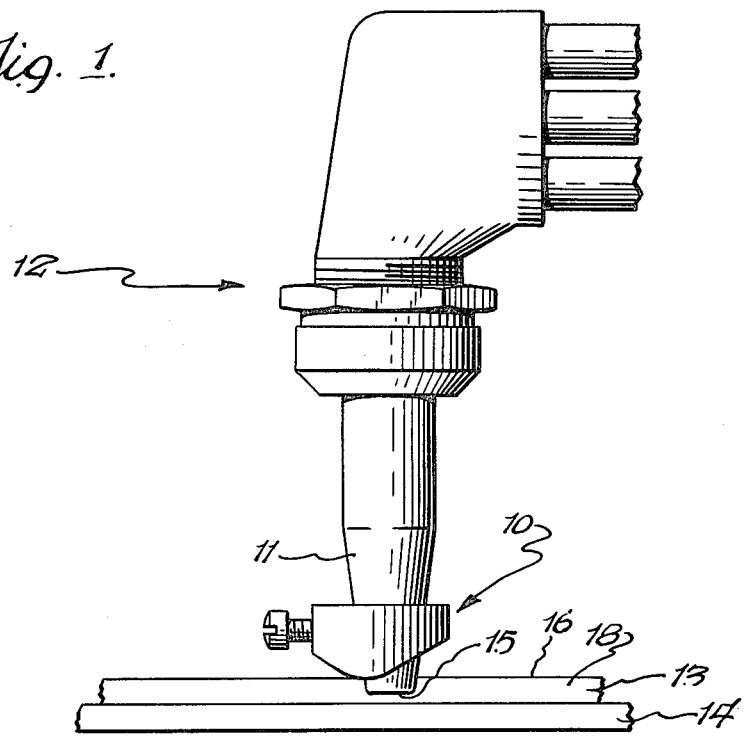
FIG. 1 is a perspective view of the improved guide mounted on the nozzle marginal end portion of a cutting torch, and engaging a straight-edge resting on a workpiece.

At the outset, it should be clearly understood that like reference numerals are intended to identify the same elements and/or structure consistently throughout the several drawing figures, as such elements and/or structure may be further described or explained by the entire written specification, of which this detailed description is an integral part.

Referring now to the drawings, and more particularly to FIG. 1 thereof, the invention provides an improved guide, of which the presently preferred embodiment is generally indicated at 10, which is adapted to be mounted on the nozzle marginal end portion 11 of a cutting torch, generally indicated at 12, and used in association with a planar surface or straight-edge 13 to guide movement of the cutting torch along a workpiece 14.

In FIG. 1, the cutting torch is only fragmentarily shown because the details of such a cutting torch are well known to those skilled in this art. Cutting torch 12 is of the oxyacetylene type and terminates in a lowermost downwardly-convergent frusto-conical nozzle end portion 11 immediately above its discharge face 15.

The workpiece 14 is depicted as being a piece of plate stock, although various other workpiece shapes and configurations may be readily substituted therefor. The straight-edge 13 is simply a length of flat plate stock lying on top of the workpiece and having an upper horizontal planar surface 16. The straight-edge vertical side surface 18 facing the under parallel to the movement of the cutting torch this being either from left-to-right or right-to-left in FIG. 1.

Figure 2:
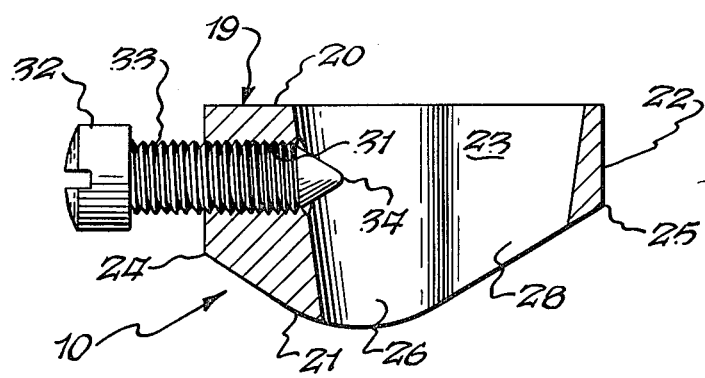
FIG. 2 is an enlarged vertical sectional view of the guide shown in FIG. 1, with the nozzle marginal end portion removed.
Figure 3:
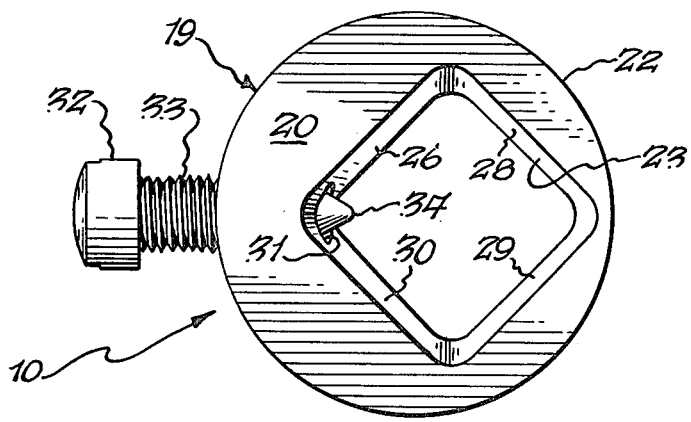
FIG. 3 is a top plan view of the guide shown in FIG. 2.

Referring now particularly to FIGS. 2 and 3, the inventive guide 10 is depicted as including a member, generally indicated at 19. Member 19 has a circular horizontal planar upper surface 20, a lower convex surface 21, and an intermediate cylindrical side surface 22. Member 19 is also provided with a vertical through passage 23 communicating the upper and lower surfaces 20, 21, respectively to accommodate passage of the nozzle end portion 11, as shown in FIG. 1. The lower surface 21 is configured as a cam in the plane of the paper, and is adapted to slidingly engage the upper surface 16 of the straight-edge, as also shown in FIG. 1. The cam surface 21 is transversely uniform, so that two lines in said cam surface and perpendicular to the plane of the paper, may be parallel to one another. The cam surface thus terminates in two points 24, 25 at its intersection with the side wall 22 in the plane of the paper.

The passage 23 is shown as having a substantially rectangular horizontal cross-section, taken at various points along its vertical extent. As best shown in FIG. 3, the four surfaces of the member forming the walls 26, 28, 29, 30 of the passage are inclined or tapered both downwardly and inwardly. However, the passage may be formed to have other configurations as desired.

As best shown in FIG. 2, a horizontal tapped hole 31 communicates the member side surface 22 with the intersection of passage walls 26, 30. A set screw 32 has its threaded shank portion 33 matingly received in tapped hole 31, and has its pointed nose 34 arranged in the passage 23. Hence, set screw 32 may be suitably rotated to move nose 34 toward and away from the intersection of passage walls 28, 29.

In use, the set screw 32 is backed off, and the nozzle end portion is passed through the member passage until the nozzle discharge face is in a desired position relative to the member cam surface 21. Thereafter, the set screw is tightened so as to hold the member and nozzle end portion firmly together. Persons skilled in this art will appreciate that the nozzle end portion 11 will contact the passage walls 28, 29 in either point or line contact, and be contacted by the nose of set screw 32.

With the guide so attached to the nozzle end portion, the cutting torch may be tilted in the plane of the paper so as to adjust the spacing of the nozzle discharge face 15 from the workpiece. While maintaining the desired tilt angle, as determined by the operator, the torch may be slid along the straight-edge to facilitate an improved "cut" in the workpiece.

Of course many changes and modifications may be made. For example, the other means, such as a bolt or the like, may be readily substituted for set screw 32. The passage may be formed to have a different configuration. The cam surface, side surface and upper surface may also be varied, as desired.

Therefore, while a preferred embodiment of the inventive guide has been shown and described, and several modifications thereof discussed, persons skilled in this art will readily appreciate that various additional changes and modifications may be made without departing from the spirit of the invention, as defined by the following claims.

What is claimed is:

1. A guide adapted to be mounted on the nozzle marginal end portion of a cutting torch and used in association with a straight-edge for guiding the movement of said cutting torch along a workpiece, said guide comprising:

A member having an upper surface, a lower surface, and a side surface, said member also having a through passage communicating said upper and lower surfaces to accommodate passage of said nozzle marginal end portion, the surface on said member forming a wall of said passage being tapered inwardly toward said lower surface, said lower surface being configured as a convex cam in one direction and adapted to slidably engage said straight-edge; and means mounted on said member for selectively holding said member to said nozzle marginal end portion;

whereby said cutting torch may be tilted to vary the spacing of said nozzle from said workpiece.

2. A guide as set forth in claim 1 wherein said passage has a substantially rectangular cross-section.

3. A guide as set forth in claim 1 wherein said passage has a substantially rectangular cross-section.

4. A guide as set forth in claim 1 wherein said means is a set screw.

5. A guide as set forth in claim 1 wherein a line in said lower surface is parallel to another line in said lower surface.

* * * * *